Figures 1, 2:
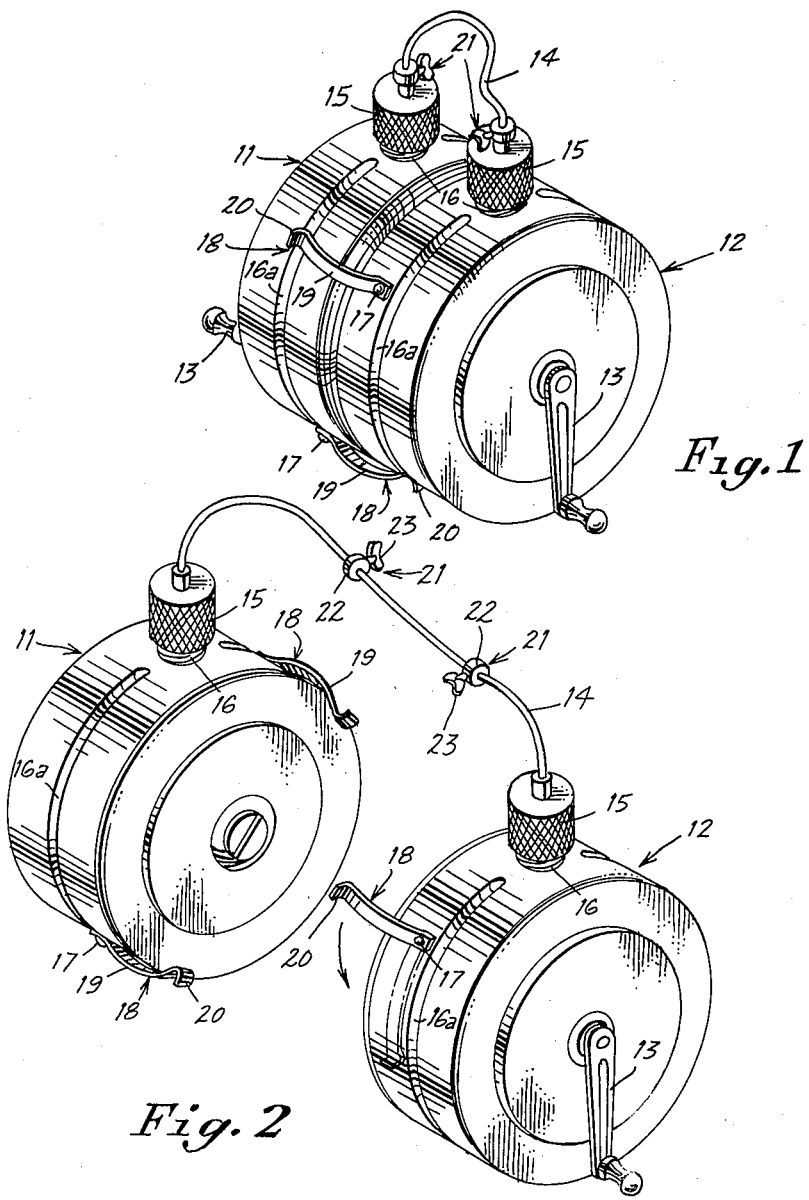

Feb. 26, 1963     A. E. FOSTER     3,078,581
CHALK LINE HOLDER
Filed Aug. 16, 1960

INVENTOR
Arthur E. Foster,
BY
ATTORNEY

United States Patent Office 3,078,581
Patented Feb. 26, 1963

3,078,581
CHALK LINE HOLDER
Arthur E. Foster, Falls Church, Va.
(1112 North View Drive, Cocoa, Fla.)
Filed Aug. 16, 1960, Ser. No. 49,935
4 Claims. (Cl. 33—87)

The present invention relates to a chalk-line holder and it consists in the combinations, constructions and arrangements of parts hereinafter described and claimed.

Generally there is provided an improved chalk-line holder of the type utilized by masons, bricklayers, carpenters and the like. In the known devices of this type, there is provided a single casing from which emanates a retractable line, there being provision within the casing for chalking the line as it emanates from the casing. Artisans usually work in pairs with one end of the device being held by one worker while the other pulls out the line a desired distance and snaps the same to mark a line upon the surface of the work with bluing, that is to say Persian blue. If the line is not properly marked or not distinct, it is necessary to wind out another length from the box being held by the first worker after which the line is again snapped to rechalk the same. In the instant invention there is provided a pair of casings and a line extending from one casing to the other. Both casings are provided with chalking devices for the line and both are provided with means for extending or retracting the line. When the device is not in use it may be assembled as a single unit with the use of novel latch members forming a part of the invention and carried by each of the casing members. Novel snapping tabs are provided for the line.

It is accordingly an object of the invention to provide a novel chalk-line holder which is simple in construction, inexpensive to manufacture and yet effective and efficient in use.

Still another object of the invention is to provide, in a device of the character set forth, a pair of casings and a line extending from one casing to the other with means in each casing for extending and retracting the line and for re-chalking the same.

Another object of the invention is to provide, in a device of the character set forth, novel snapping tabs forming a part of the invention.

Still a further object of the invention is to provide, in a device of the character set forth, novel latch members forming parts of the invention.

Other and further objects of the invention will become apparent from a reading of the following specification taken in conjunction with the drawing, in which:

FIGURE 1 is a perspective view of an embodiment of the invention illustrating the same in retracted position, and FIGURE 2 is a view similar to FIGURE 1 but illustrating the device as it would appear in actual use.

Referring more particularly to the drawing, there is shown therein a chalk line holder comprising a pair of casings generally indicated at 11 and 12. These casings 11 and 12 are identical, each containing therein a reel (not shown) which is operable by a handle 13 and upon which is wound a chalk line 14 which extends through a knurled cap 15 attached to a fitting 16 in each case. All of this is conventional in a single casing 11 or 12.

In the instant invention the chalk line 14 is continuous and extends from one reel in the casing 11 to the other reel in the casing 12 through the knurled caps 15.

Each of the casings 11 and 12 is cylindrical in shape as is customary but, in accordance with the invention is provided with an elongated groove 16a centrally located in its cylindrical wall.

Adjacent that end of each of the casings 11 and 12 remote from the handle 13 there is pivotally mounted, as indicated at 17 two or more circumferentially spaced latch members generally indicated at 18. Each of the latch members is outwardly bowed, as indicated at 19 and provided at its free end with an outturned foot 20.

The chalk line 14 has mounted thereon a pair of snapping tabs generally indicated at 21 and each consists of a small cylindrical member 22 slidable along the line 14 and a winged set screw 23, as indicated in FIGURE 2.

In operation, it will be apparent that when the device is not in use, the latch members 18 may be pivoted to a longitudinally extending position as indicated in FIGURE 2 and that the casings 11 and 12 may then be brought together so that the latch members carried by the casing 11 will engage in the groove 16a in the casing 12 while the latch members 18 carried by the casing 12 will engage in the groove 16a of the casing 11 thus securely latching the two casings 11 and 12 together as a compact unit as indicated in FIGURE 1. Of course, when this occurs, the slack in the line 14 may be taken up by properly manipulating the handles 13.

When, however, it is desired to utilize the device, the latch members 18 may be disengaged from their respective grooves and each latch may then be moved to the dotted line position shown in FIGURE 2 or, in other words, into positions bearing against the curved walls of their respective casings. Being thus disengaged, two artisans may each take one of the casings 12 and the line 14 may then be manipulated as desired between them. For example, one workman may continue to draw the line 14 from the casing held in the hands of the other workman until the entire line is utilized for its purposes after which, with the workmen remaining in their respective positions, the line may be payed out in a reverse manner, it being understood that the casings 11 and 12 each contain chalk which re-chalks the line 14 while the line is within its respective casing. When it is desired to snap the line 14 against the side of the building or the like to place a marking line thereon, it is only necessary to grasp one of the set screws 23 to move the line away from the building and then release the same whereupon a line will be imparted to the building in the customary manner without, however, the workman getting his fingers covered with chalk as is customarily the case.

While but one form of the invention has been shown and described herein, it will be readily apparent to those skilled in the art that many minor modifications may be made without departing from the spirit of the scope of the appended claims.

What is claimed is:

1. A chalk-line holder comprising a pair of casings, a single line extending between said casings, means for moving portions of said line into and out of each of said casings, and means for latching said casings together, said latching means comprising a plurality of latch members pivotally mounted on each casing and each engageable with the other casing.

2. A chalk-line holder in accordance with claim 1 wherein each casing is provided with a groove and wherein the latch members attached to the other casing are releasably engageable in said groove.

3. A chalk-line holder in accordance with claim 2 wherein each of said casings includes a cylindrical wall having a circumferential groove therein, wherein the latch members are each pivoted at one end to their respective casings, wherein each latch member is bowed to rest normally against its associated cylindrical wall, and wherein each latch member has formed at its free end a foot member engageable in the groove of the other casing when in operative position.

4. A device as defined in claim 2 wherein a pair of snapping tabs is mounted upon said line, said snapping tabs each including a cylindrical body slidable upon said line and a set screw extending radially into said body.

References Cited in the file of this patent

UNITED STATES PATENTS

| | | |
|---|---|---|
| 65,057 | Carter | May 28, 1867 |
| 353,919 | Charman | Dec. 7, 1886 |
| 2,685,742 | Johnson | Aug. 10, 1954 |
| 2,728,143 | Buchet | Dec. 27, 1955 |
| 3,046,663 | Romero | July 31, 1962 |